United States Patent [19]

Stumpp et al.

[11] 4,362,050

[45] Dec. 7, 1982

[54] FUEL INJECTION NOZZLE FOR INTERNAL COMBUSTION ENGINES

[75] Inventors: Gerhard Stumpp; Ewald Eblen, both of Stuttgart; Karl Hofmann, Remseck; Odon Kopse; Néstor R. Amaya, both of Stuttgart; Josef Schlagenhauf, Esslingen; Johannes Locher, Stuttgart, all of Fed. Rep. of Germany

[73] Assignee: Robert Bosch GmbH, Stuttgart, Fed. Rep. of Germany

[21] Appl. No.: 166,924

[22] Filed: Jul. 8, 1980

[30] Foreign Application Priority Data

Aug. 10, 1979 [DE] Fed. Rep. of Germany ....... 2932480

[51] Int. Cl.$^3$ ........................................... G01M 15/00

[52] U.S. Cl. .................................................. 73/119 A

[58] Field of Search ............... 73/19 A; 123/297, 305; 137/554

[56] References Cited

FOREIGN PATENT DOCUMENTS 522651 11/1953 Italy ................................ 73/119 A 898238 6/1962 United Kingdom ............ 73/119 A

*Primary Examiner*—Jerry W. Myracle

*Attorney, Agent, or Firm*—Edwin E. Greigg

[57] ABSTRACT

A fuel injection nozzle is proposed, intended in particular for Diesel engines, in which an induction coil is installed in an intermediate disc. The coil core is embodied by a pressure element and a valve needle in force-locking contact therewith. An annular permanent magnet is secured either on the pressure bolt or on the intermediate plate. This embodiment of an injection nozzle, as a so-called needle stroke transducer, is used when it is desired to ascertain the duration of injection and especially the onset of injection.

11 Claims, 4 Drawing Figures

FUEL INJECTION NOZZLE FOR INTERNAL COMBUSTION ENGINES

BACKGROUND OF THE INVENTION

The invention relates to a fuel injection nozzle for internal combustion engines having an induction coil attached to the housing and a reciprocable valve needle. An injection nozzle of this kind is known from British Pat. No. 729,431, for instance, in which the induction coil is housed in an extension of the housing and an extension of the valve needle acts as the coil core. In comparison with conventional nozzles, this injection nozzle requires an extended housing and a longer valve needle.

A fuel injection is also known from German Auslegeschrift 10 49 635, in which the housing is also extended in the axial direction in order to contain the induction coil, and the valve needle is correspondingly lengthened.

OBJECT AND SUMMARY OF THE INVENTION

The fuel injection nozzle according to the invention described herein has the advantage over the prior art discussed above that mass-produced injection nozzles can be converted into injection nozzles intended for electric measurement of the injection onset, without the external form of the nozzle having to be altered.

As a result of the characteristics disclosed herein, advantageous modification of and improvements to the fuel injection nozzles disclosed in the main claim are possible. With the embodiments of the invention shown herein, the source of electric current feeding the induction coil is not required. A secure, releasable contacting of the induction coil is attained with a permanent magnet made of cobalt and samarium. With other embodiments of the invention, two routes are indicated for assuring the connection of the contact with the counterpart contact on a long-term basis, even during rough engine running.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
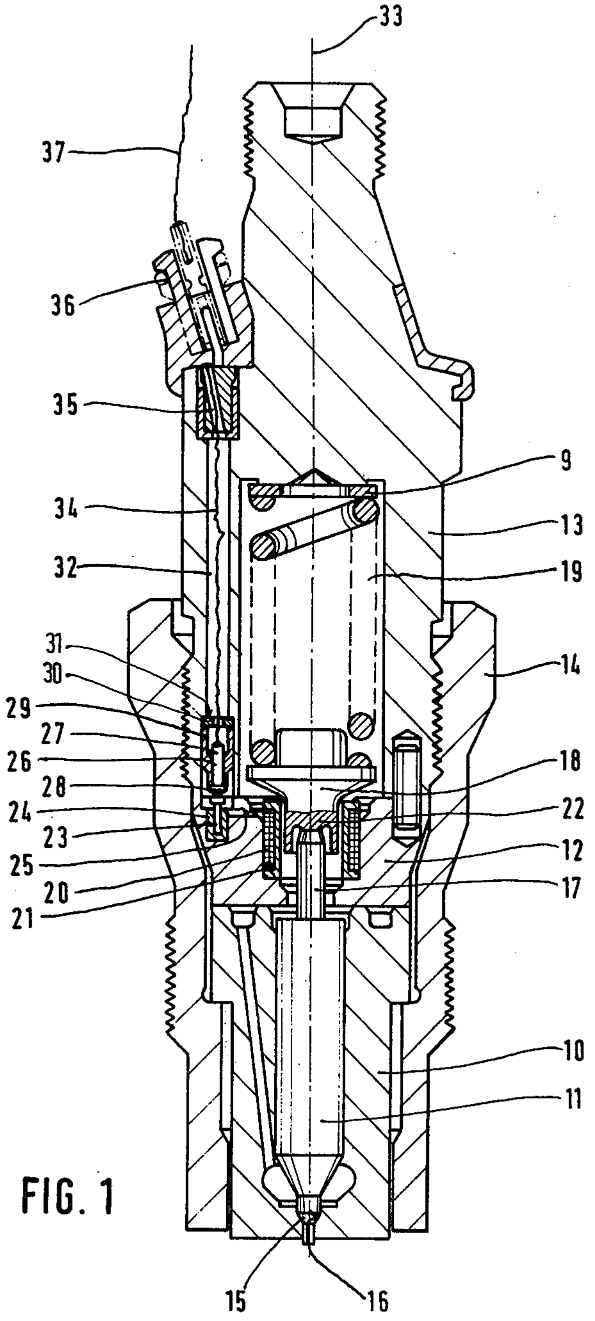
FIG. 1 shows generally in cross-section the first exemplary embodiment having an elastically secured counterpart contact.

The fuel injection nozzle shown in FIG. 1 is predominantly rotationally symmetrical and substantially comprises a nozzle body 10, a valve needle 11 guided therein, an intermediate plate 12, and a sleeve nut 14 axially bracing these elements. A sealing cone 15 of the valve needle 11 cooperates with a valve seat 16 of the nozzle body 10, and a pressure tang 17 of the valve needle 11 is in force-locking contact with a pressure element 18. A compression spring 19 supported via a spring adjustment disc 9 on the nozzle holder 13 presses with initial tension on the pressure element 18 (in the illustrated closed position).

A recess 21 open toward the nozzle holder 13 is disposed in the intermediate plate 12, and an induction coil 20 is glued in this recess 21. The axial extension of the coil and the depth of the recess are dimensioned such that in the closing position the section 22 of the pressure element 18 protrudes approximately medially of the coil.

A contact element 23 has a head 28 and a shaft 27, which is connected with the conduction end 25 of the induction coil 20 and is inserted by means of an insulating sheath 24 into the intermediate plate 12. A counterpart contact element 26 likewise has a head 28 and a shaft 27, which is surrounded by an elastic insulating sheath 29. This sheath 29, in turn, is supported via a pressure disc on the shoulder of a channel 32 which extends parallel to the axis 33 within the nozzle holder 13. The two contact elements 23 and 26 are disposed in their axial position such that their heads 28, in the illustrated functional status of the injection nozzle, produce a secure and reliable contact. A line 34 leads from the shaft 27 of the counterpart contact 26 to a plug connection 35 secured in an insulated manner in the nozzle holder 35. A line 37 is connected to this plug connection 35 via a coupler element 36. In the same manner, a line leads from the second conduction end 25 of the induction coil 20 to the second plug connection, in a manner like that described above but not shown in the drawing. With the given circuitry, one conduction end of the coil and the corresponding plug connection can be connected to ground.

Figure 2:
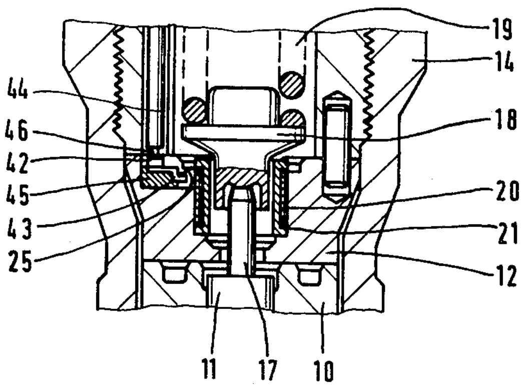
FIG. 2 shows generally in cross-section a detail of the second exemplary embodiment having a yielding contact element.

The second exemplary embodiment, of which only a detail is shown in FIG. 2, has the same reference numerals for elements which are identical with or similar to those of FIG. 1. A contact element 43 secured to the intermediate plate 12 via an insulating element 45 is connected with the induction coil via the line 25 and is embodied as a spring tongue 42. The counterpart contact element 46 is represented by the end portion of an insulated line 44, which is likewise connected with the plug connection, not shown here. The contact element 43, which is yieldable in the axial direction, and the counterpart contact element 46 touch one another in the region of the intermediate plate 12 and the sleeve nut 14, thus representing a secure electrical connection of the two lines 25 and 44.

The induction coil is connected via two lines 37 to the constant current source and the test appliance (neither of which is shown).

Figure 3:
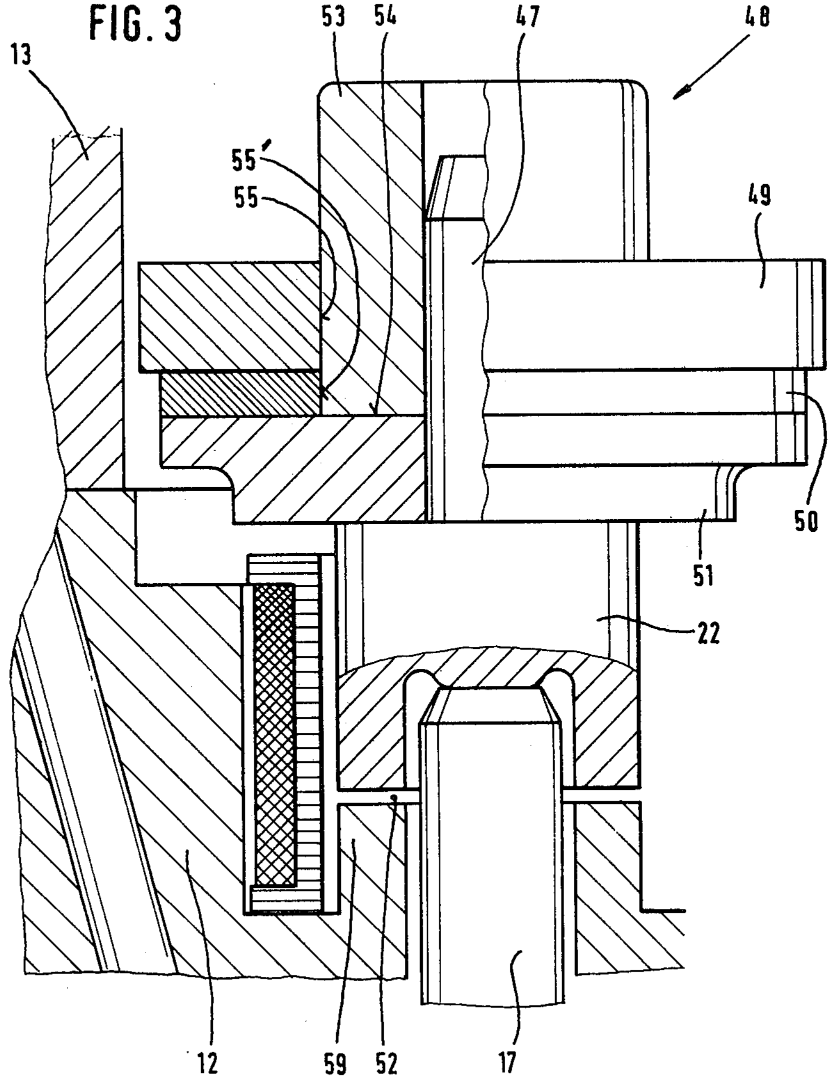
FIG. 3 shows in an enlarged detail view the third exemplary embodiment with the first disposition of a permanent magnet.

The third exemplary embodiment in FIG. 3 shows the pressure element 48 with the hollow section 22, which receives the pressure tang 17, and a tang 47. A flange 51 and a sheath 53 of anti-magnetic material are pushed onto this tang 47, and inserted through a bore 55 in a slotted disc 49 and through a bore 55' in an annular permanent magnet 50, with the end face 54 of the sheath 53 arranged to rest on the flange 51. The annular permanent magnet 50, preferably of cobalt and samarium, is secured on the flange 51 by means of the slotted disc 49.

The coil 20, as described above, is glued in the intermediate plate 12 and there is a ring 59 surrounding the pressure tang 17 offstanding from the intermediate plate 12 in the axial direction. This ring 59, with the hollow section 22, forms the working air gap 52.

Figure 4:
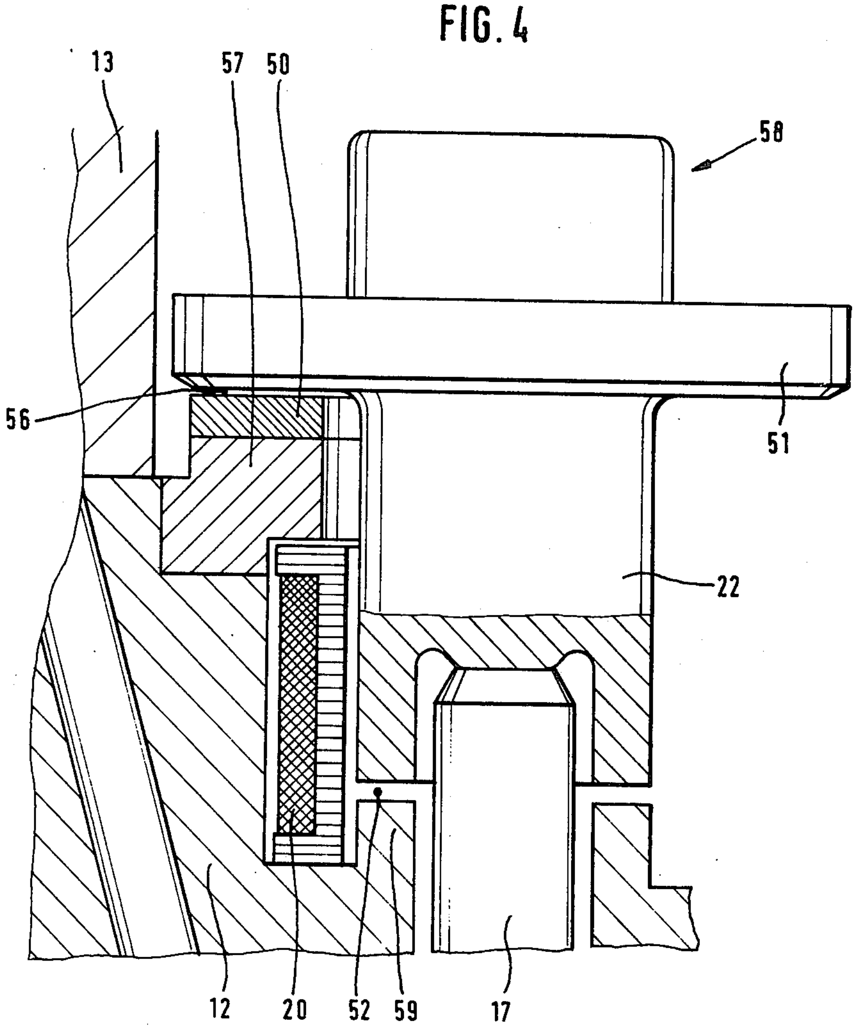
FIG. 4 shows in another enlarged detail view the fourth exemplary embodiment with the second disposition of a permanent magnet.

The fourth exemplary embodiment of FIG. 4 differs from the third exemplary embodiment in that the permanent magnet 50 made of cobalt and samarium is secured on a support ring 57 of the intermediate plate 12, and this support ring 57 simultaneously secures the induction coil 20 axially. The ring 59, axially surrounding the pressure tang 17, of the intermediate disc 12 together with the hollow section 22 of the pressure bolt 58 here likewise form the working air gap 52, and a second working air gap 56 is formed by the permanent magnet 50 and the flange 51 of the pressure bolt 58. The exemplary embodiments 3 and 4, having a permanent magnet 50, do not require connection to a source of electric current in order to generate the necessary magnetic field. In a manner not shown, the coil ends lead from the induction coil 20 to the test appliance.

The foregoing relates to preferred exemplary embodiments of the invention, it being understood that other embodiments and variants thereof are possible within the spirit and scope of the invention, the latter being defined by the appended claims.

What is claimed and desired to be secured by letters patent of the United States is:

1. A fuel injection nozzle for internal combustion engines comprising a nozzle body (10), containing a valve needle (11) including a pressure tang (17), said nozzle body being fastened to a nozzle holder (13), a closing spring (19) disposed in said nozzle holder, which reacts on said pressure tang (17) of the valve needle (11) via a pressure element (18); an intermediate plate (12) axially between the nozzle body (10) and the nozzle holder (13), said intermediate plate having a recess (21) for the penetration of said pressure tang (17) of the valve needle (11), said intermediate plate forming a stop for limitation of the opening stroke of the valve needle (11) in concert with an annular shoulder in the transition of the tang (17) to an unweakened part of the valve needle (11) and which acts as a coil core to change the reluctance of a magnetic field formed by the induction coil to create a signal; characterized in that said induction coil (20) is imbedded in the recess (21) of said intermediate plate (12) and the tang (17) of the valve needle (11) extends at least partially through the induction coil (20), and a section (22) of the pressure element (18) extends through the induction coil (20) to form a coil core for said induction coil.

2. A fuel injection nozzle according to claim 1, characterized in that the recess (21) in the intermediate plate (12) has an enlarged recess area oriented in an axial direction towards the nozzle holder (13), said recess 21 having a shoulder on an end oriented towards the nozzle body (10) and in which the induction coil (20) is secured.

3. An injection nozzle as defined by claim 1, characterized in that said induction coil is supplied with a constant electric current.

4. An injection nozzle as defined by claim 1, characterized in that said pressure element further includes a support zone for an annular flanged member on which is received an anti-magnetic sheath, an annular permanent magnet and a slotted disc.

5. An injection nozzle as defined by claim 4, characterized in that an air gap is provided between said intermediate plate member and said pressure element.

6. An injection nozzle as defined by claim 4, characterized in that said annular permanent magnet is made of cobalt and samarium.

7. An injection nozzle as defined by claim 1, characterized in that said pressure element is further arranged to support an annulus together with an annular permanent magnet and said pressure element further includes a flanged portion that overhangs said permanent magnet in spaced relation to said permanent magnet to thereby provide an air gap between said permanent magnet and said flanged portion.

8. An injection nozzle as defined by claim 1, characterized in that a second working air gap is provided between said intermediate plate member and said pressure element.

9. A fuel injection nozzle for diesel internal combustion engines comprising a housing, an induction coil attached to said housing for producing a magnetic field, a reciprocable valve needle in said housing, said valve needle comprising a coil core, said coil core including a pressure element and a portion of said valve needle, said valve needle coil core having a stroke arranged to vary the reluctance of said magnetic field produced by said induction coil to produce a signal, an intermediate plate member to which said induction coil is secured, a nozzle holder which abuts said intermediate plate member, said intermediate plate member and said nozzle holder including complementary upper and lower contact elements, said nozzle holder further including an elongated channel having a shoulder and a plug connection and an electrical line extending between said plug connection and at least one of said contact elements.

10. An injection nozzle as defined by claim 9, characterized in that said lower contact element has a spring tongue means.

11. An injection nozzle as defined by claim 9, characterized in that said upper contact element further includes a dependent headed portion and an upstanding stud portion, said stud portion encompassed by an insulating sheath, said sheath in abutment with a pressure disc and said pressure disc arranged to engage said shoulder of said channel.

* * * * *